June 18, 1946.  R. E. KINKEAD  2,402,165
PROCESS OF ARC WELDING
Filed Aug. 13, 1941  3 Sheets-Sheet 3
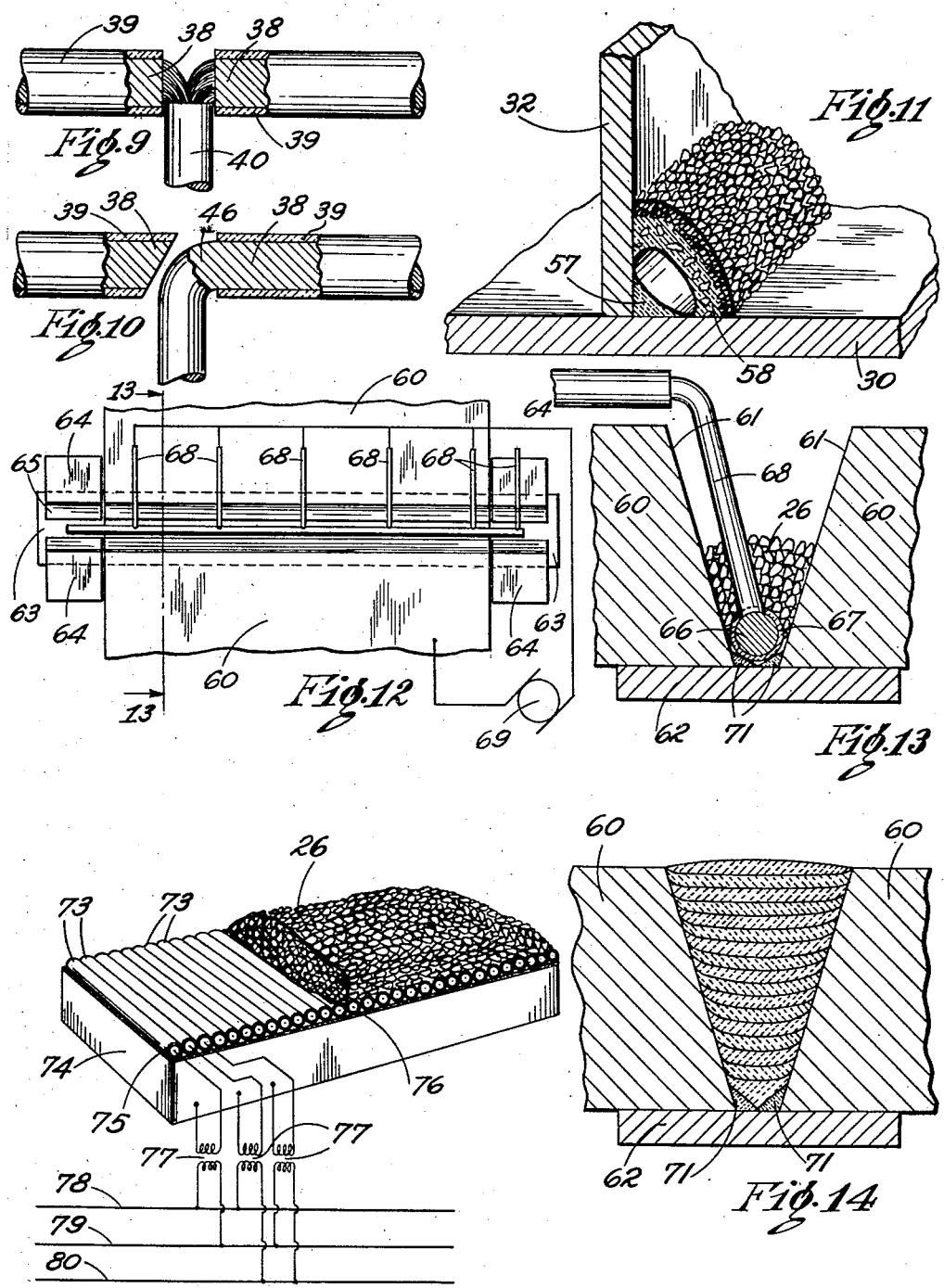
INVENTOR.
ROBERT E. KINKEAD
BY Rickey & Watts
ATTORNEYS

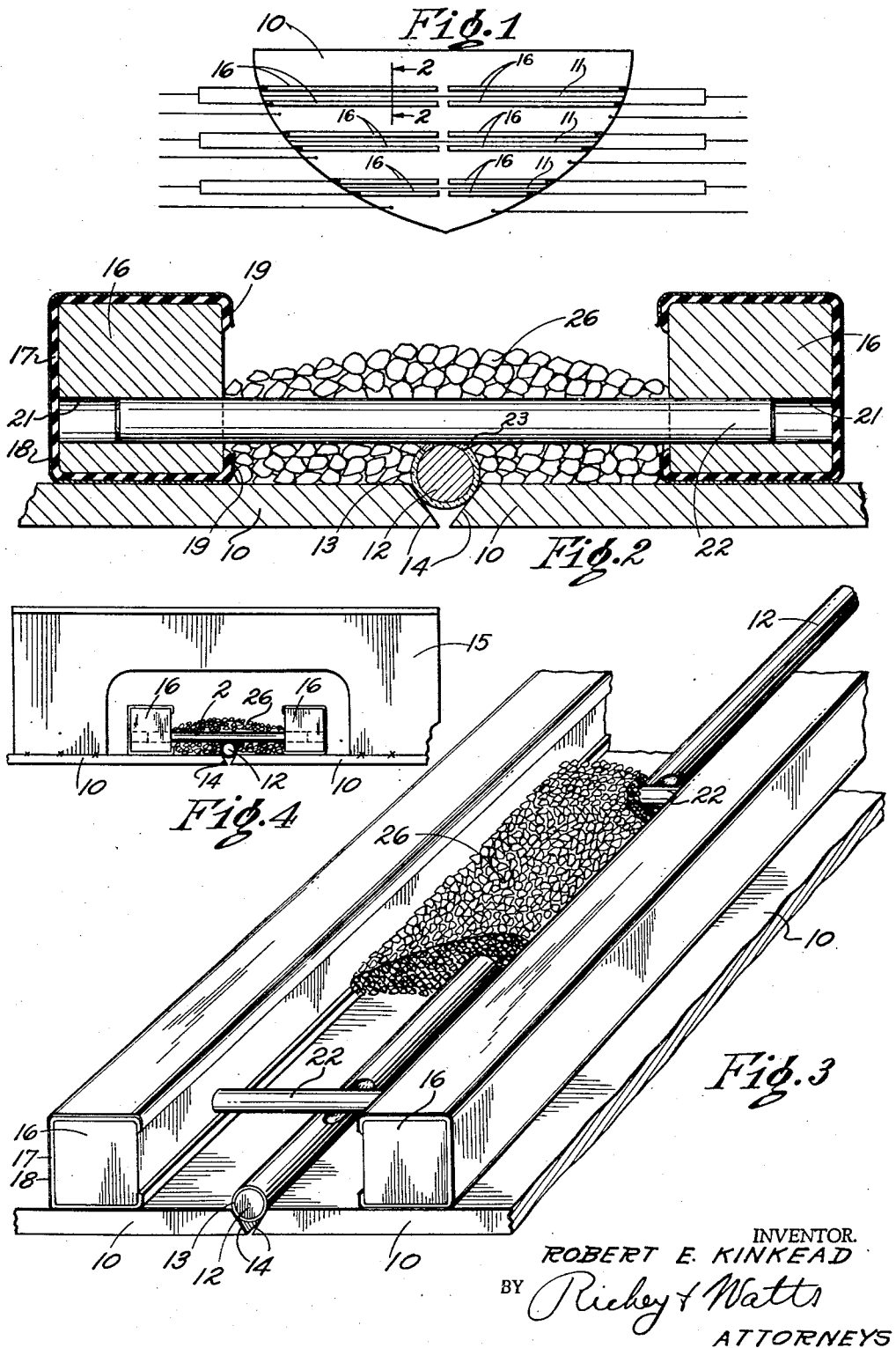

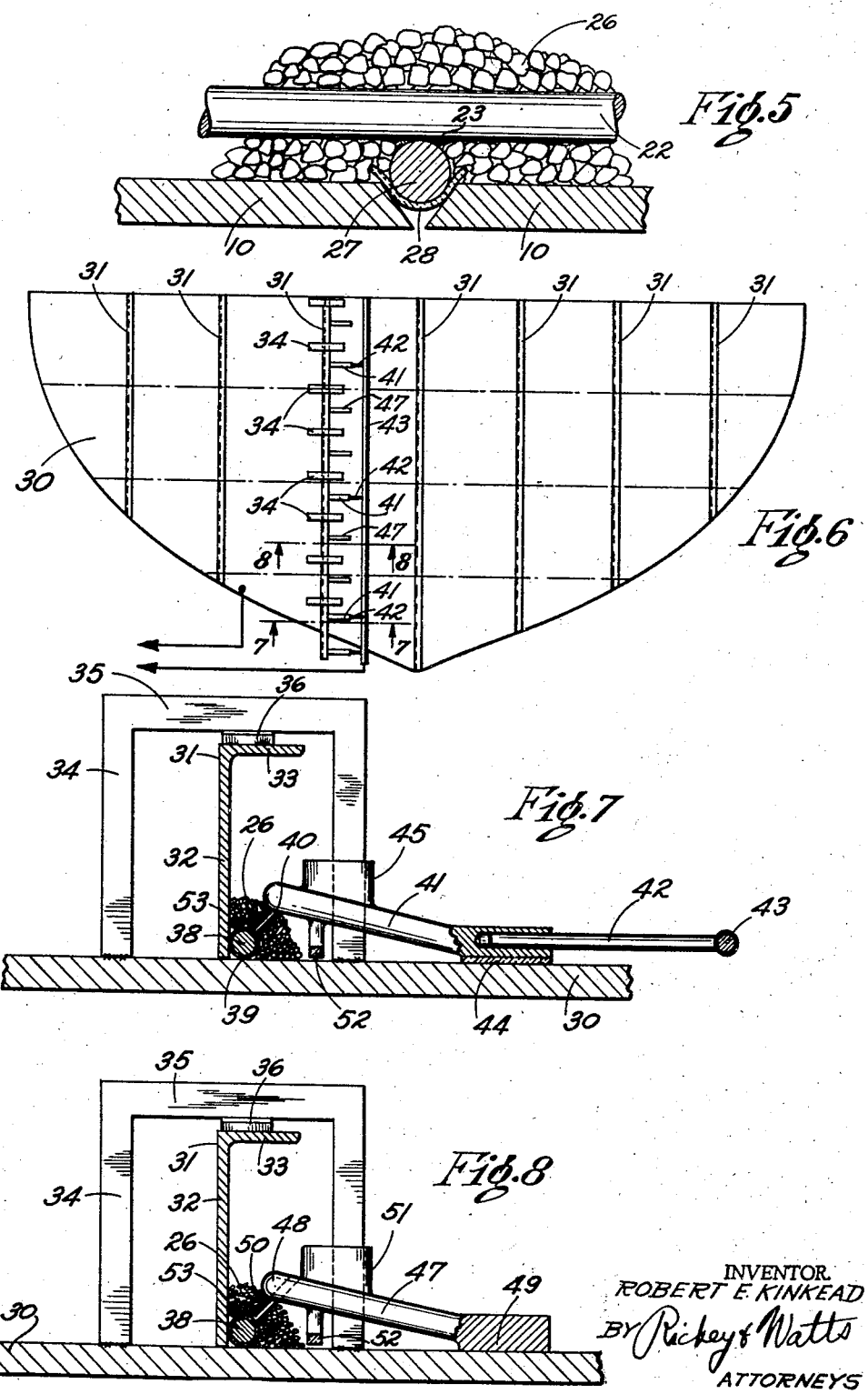

UNITED STATES PATENT OFFICE 2,402,165

PROCESS OF ARC WELDING

Robert E. Kinkead, Shaker Heights, Ohio

Application August 15, 1941, Serial No. 406,695

16 Claims. (Cl. 219—10)

This invention relates to improvements in electric arc welding.

Metallic electrode arc welding was originally practiced by connecting a bare metallic electrode to one side of the welding current supply, connecting the other side of the current supply to the piece or pieces to be welded, striking an arc between the end of the electrode, and moving the electrode along the seam to deposit the metal of the electrode on the work as desired. In this process the metal of the weld absorbed oxygen and nitrogen from the air which contaminated the weld metal and rendered it porous and brittle. Efforts were made to avoid this difficulty by covering the weldrods with mineral substances which would decompose from the heat of the arc to form a blanket of slag to protect the weld metal from contact with the air. None of these proposals, however, were capable of producing a weld metal with properties substantially equal to those of the parts to be joined.

Coated electrodes for use in the conventional hand arc welding processes which produce welds free from contamination with oxygen and nitrogen and with satisfactory properties have been developed and are commercially available. The covering or coating material of such electrodes ordinarily includes materials which form a large volume of gas to provide a gaseous shield about the arc, ionizing elements which sustain the arc, fluxing or slag forming elements, and reducing agents. Such electrodes are ordinarily used by gripping one end of the electrode in a holder, striking an arc with the other end against the piece to be welded, holding the electrode substantially perpendicular to the surface to be welded, moving the electrode along the seam or surface and simultaneously feeding it toward the seam at the same rate so that the metal of the electrode is deposited by the arc.

The same operation may be carried out by automatic arc welding machines.

To avoid the necessity of nicely correlating the movement of the electrode along the seam and the feeding movement with the rate at which metal is deposited by the arc, efforts have been made to weld seams by laying weld rods or electrodes along the seam suitably spaced and insulated from the metal to be welded, supplying current to the electrode, starting the arc at one end, and allowing the arc to progress along the seam and the electrode as the electrode is consumed. These proposals have been known as self-consuming electrode processes. Attempts to weld in this manner by protecting the electrode with slag forming or fluxing material, however, have not been successful and have not produced satisfactory welds. It has also been proposed to utilize this self-consuming electrode principle using the conventional electrode covered with material to provide a gaseous shield for the arc, and with spaced or progressive electrical contacts to the electrode so that a relatively long electrode can be consumed in one continuous operation. This proposal, however, has had but limited application because the metal of the electrode tends to spatter or fly out in an axial direction from the end of the electrode instead of depositing evenly in the arc crater, thus producing blow holes and other defects in the weld. To avoid the spattering with its accompanying defects it has been attempted to reduce the current density with a corresponding reduction in speed of welding. The reduced speed of welding renders the process uneconomical for general application, and the reduced quantity of heat in the arc interferes with the proper operation of the fluxing elements so that some of the slag tends to be trapped in the weld metal instead of being floated to the surface. Also the gaseous shield fails to prevent contamination.

The principal object of the present invention is to provide a method of welding in which an electrode is laid along the seam or surface to be welded and an arc is caused to progress along the electrode as it is consumed, by which welds of satisfactory quality, free from blow holes and from contamination by the atmosphere can be produced rapidly and with high current densities. Other objects are to minimize the time, labor, and apparatus for making welds of this type; to feed the welding current to the electrode in such a manner that long electrodes may be laid and welded without excessive heating of the electrode or variation in the resistance as the electrode is consumed; to make fillet welds of satisfactory quality between horizontally and vertically disposed members; to make either butt or fillet welds on relatively long seams rapidly and continuously and in places inaccessible to the usual welding machine; to reduce the hardness in the weld by retarding the rate of cooling of the weld metal; to build up successive layers of weld metal in long seams without the formation of craters or other irregularities or weaknesses in the seam; and to improve the methods of making relatively large welded structures, such as bulkheads and other parts of vessels, by simultaneously making either a plurality of butt welds or a plurality of fillet welds.

Further objects are to accurately and automatically control the amount of metal deposited in each part of the weld; to make uniform welds of a composition differing from that of the weld rod by adding uniform quantities of alloying materials; and to make composite metal slabs and the like with a layer of added metal of uniform thickness and composition by depositing a plurality of electrodes over the surface of the slab or the like, with or without an added layer of alloying elements.

I have discovered that these and other objects may be attained by laying the weldrod and a gaseous shielding element along the seam or surface to be welded and covering the rod with gravel, broken glass, or other slag forming material in particles large enough to avoid smothering the arc and permit the gas of the gaseous shield to escape between the particles, and small enough to fuse from the heat of the arc. The gaseous shield may be obtained by using a standard coated electrode having a coating embodying gas forming, ionizing and reducing elements, or a strip or layer of such material may be interposed between the metal to be welded and a conventional bare electrode. The term "coated electrode" is used hereinafter to designate an electrode coated with material embodying gas forming and ionizing elements. The combination of the gaseous shield inside the slag shield confines the arc and the molten metal from the electrode to the area of the arc crater formed in the pieces to be welded, preventing spattering of the metal or contamination of the weld with such effectiveness as to permit the use of high current densities with consequent increase of speed of welding and improvement of the weld, and to permit the formation of a perfect fillet weld between members arranged vertically and horizontally.

In the accompanying drawings, which illustrate preferred arrangements of the apparatus for carrying out this invention:

Figure 1 is a diagrammatic plan view of a series of plates arranged to form a bulkhead of a vessel with a welding rod disposed in each seam ready for simultaneous butt welding of all the seams in accordance with this invention;

Figure 2 is a cross section on an enlarged scale through a seam ready for welding, taken substantially on the plane indicated by the line 2—2 on Figure 1;

Figure 3 is a perspective view of a seam on an enlarged scale, a part of the gravel being removed to show the welding rod;

Figure 4 is a section through a seam on a reduced scale, showing temporary tacked bars to prevent warping;

Figure 5 is a cross section through a seam ready for welding, but showing the arrangement of a bare electrode with a strip of gaseous shielding material in place of a covered electrode;

Figure 6 is a diagrammatic plan view of a bulkhead with stiffeners positioned thereon and weldrods arranged to form fillet welds on one side between one of the stiffeners and the bulkhead in accordance with this invention;

Figure 7 is a cross section on an enlarged scale taken on the line 7—7 of Figure 6;

Figure 8 is a similar section taken on the line 8—8 of Figure 6;

Figure 9 is a detail plan view showing a contact pin welded to the ends of two covered weldrods;

Figure 10 is a detail plan view showing a different arrangement for using individual coated electrodes;

Figure 11 is a perspective view showing a completed fillet weld before removal of the slag;

Figure 12 is a plan view of an arrangement to make a built-up butt weld between thick plates, such as armor plate;

Figure 13 is a section on the line 13—13 of Fig. 12;

Figure 14 is a section similar to Figure 13 showing a completed weld;

Figure 15 is a perspective view illustrating an application of the invention to make composite metal.

Referring to the drawings, I have illustrated in Figures 1 to 5, inclusive, a preferred arrangement for practicing my invention in making butt welds on an assembled structure such as the bulkhead of a vessel. Such a structure consists of a plurality of plates 10 cut to length and shaped as desired which are joined together along their adjacent side edges. In accordance with the present invention I am able to lay these plates out on a flat surface in their proper relation, with suitable hold down clamps and temporary tacked bars 15 to prevent warping, assemble the welding materials along the seams 11 between adjacent plates, and then supply a welding current to the various electrodes simultaneously or in such succession as may be desired to automatically weld the entire structure. In normal practice the stiffeners are next applied and the bulkhead is then turned over and the butt welds are completed from the flat side.

Figures 2 and 3 illustrate the method of setting up the seam preparatory to welding when using a long electrode 12 coated with a suitable material 13 for supplying a gaseous shield for the arc. The adjacent edges of the plates 10 are preferably scarfed, as indicated at 14, to form a groove into which the metal of the electrode is to be deposited, as is customary in electric arc welding. A bus bar 16, of copper or other suitable conducting metal, is arranged on each side of the seam 11. In order to prevent short circuiting each bus bar is preferably surrounded on three sides with a layer of rubber or other insulating material 17 which may be held in place by a shell 18 of sheet steel which is crimped against the open side of the bus bar as indicated at 19.

The bus bars are drilled at suitable intervals with alined holes 21 into which are inserted bare contact pins 22, preferably of the same composition as the electrode, the pins extending across the space between the two bus bars 16. The coating 13 on the electrode 12 may be removed in the vicinity of the contact pins and the centers of these pins welded to the bared upper surface of the electrode as indicated at 23. The holes 21 in the bus bars 16 are spaced up from the bottom surfaces of the bus bars a distance substantially equal to the distance the electrode projects above the surface of the plates 10 when lying in the seam, so that the weight of the bus bars acts to hold the electrode firmly in position in the seam.

The contact pins 22 are preferably spaced from about 14 inches to about 18 inches apart, which is the customary length of the individual coated steel electrodes used in the conventional hand welding operations. Thus as the arc consumes the electrode and progresses along the length of the seam it is never more than about 14 inches to about 18 inches from a contact pin connected directly to the bus bars. Using 25% chromium 20% nickel rods the spacing of the contacts may be about 6 inches to 12 inches. This arrangement minimizes the variation in resistance as the electrode is consumed and permits the use of relatively high current densities without overheating the electrode in advance of the arc.

The bus bars, contact pins, and electrodes may be assembled into relatively long units and then laid upon the seams 11 to be welded. Each electrode is then covered with a relatively coarse gravel 26 or other material as illustrated in Figures 2 and 3. Preferably the gravel is simply filled into the space between the bus bars and heaped up over the electrode to a depth equal to about the diameter of the electrode as illustrated.

When it is desired to form the weld, one side of a welding current supply is connected to each pair of bus bars 16 and the other side is connected to the plates 10 to be joined together. An arc is started at one point in the electrode, preferably by a wad of steel wool, filings, or the like interposed between a bared portion of the electrode and the plates 10, or by a carbon pencil, and the arc then progresses along the seam as the electrode is consumed. As each contact pin is reached it is burned away and current is supplied to the electrode from the next adjacent contact pin. Good electrical contact between the pins 22 and the bus bars 16 is insured by the thermal expansion of the parts, particularly the longitudinal expansion of the electrode which presses the pin 22 nearest the arc lightly against one side of its hole 21.

As illustrated in Figure 1, each pair of bus bars 16 and its connected electrode may extend from the center of a seam 11 to one end, and the arcs may be started simultaneously by steel wool or the like at the center of each seam so as to progress simultaneously in opposite directions to the ends of the seam. This arrangement is desirable with long seams to avoid the closing of the space between the plates from the contraction of the weld metal. If desired, the electrode may be continuous between the alined pairs of bus bars 16 and an arc may be started at the center. As soon as the arc has severed the electrode, two arcs are formed, each fed by one pair of bus bars. It is only necessary to provide each arc with its own connections, since it is ordinarily not possible to maintain more than one arc on a single circuit. In welding a plurality of seams of a structure such as a bulkhead, as shown in Figure 1, it is preferred to supply welding current simultaneously to all the electrodes and start arcs at the center of each seam. When the electrodes have been consumed all of the welds will have been made.

The gravel 26 is composed of separate pieces which are large enough to permit the gas from the gaseous shield of the arc to escape through the interstices between the particles without blowing the particles out of place, and small enough so that the particles will fuse from the heat of the arc. In using commercial coated welding rods having relatively thin coatings I have found that gravel particles having maximum dimensions ranging from about ⅛ of an inch to about ¼ of an inch are satisfactory. With the heavier type of coatings I prefer to use particles not smaller than about $\frac{1}{16}$ of an inch. Control of the arc may be obtained by varying the size of the particles. Thus if the particles are small and the depth of covering relatively thin the main gas escape may be through a single hole in the fused material at or near where the arc is operating, said hole being progressively closed by fused material as the arc progresses along the electrode. Where all other conditions are the same and only the size of the particles and the depth of covering are increased, the gas may escape through a considerable number of interstices and the material may not fuse on top.

I have found that ordinary silica gravel which has been washed, screened and dried works very satisfactorily. Such material consists largely of $SiO_2$ which fuses to form glass, the small quantities of iron and calcium compounds normally being present not interfering in any way with the action. Similarly broken glass that has been washed, screened, and dried operates with complete satisfaction. Alternatively, I have found that an ordinary calcium carbonate flux, composed of crushed and screened marble or limestone, may be used. This material likewise must be in particles of such size as to permit the escape of the gases at the welding crater without being displaced, and to fuse behind the weld into a coating of slag. The gravel or broken glass is preferred, however, because it gives off no additional gas in fusing and forms a slag which is more readily removed from the weld after it has cooled.

As the arc progresses along the electrode the large volume of gases formed by the gaseous shielding material in the coating 13 escape through the interstices in the gravel 26 at and immediately in advance of the arc. Gases having a reducing nature are ordinarily observed burning above the gravel. Immediately behind the arc, the gravel fuses and solidifies in the general form of a cellular glass arch extending around, and spaced from, the completed weld. Apparently the action of the gravel is primarily a mechanical action compelling the arc and the molten metal from the electrode to extend downwardly substantially at right angles to the axis of the electrode instead of extending axially of the electrode in accordance with the natural tendency which exists in the absence of the gravel. This action seems to be due, at least in part, to the fact that the gases from the gaseous shield are restrained by the fusing of the gravel from shooting out axially from the electrode, and instead are compelled to escape laterally or upwardly through the fused or unfused gravel immediately around the arc. There may, in addition, be some fluxing of the weld metal by the fused gravel or the like immediately behind the arc, but it appears that such fluxing action is unnecessary since the arc is shielded and fluxed by the coating 13.

The desired relation between the arc length, the rate of movement of the arc along the weld, and the rate at which electrode metal is added to the weld is obtained automatically with this process, eliminating the necessity of the nice correlation of these factors characteristic of hand and machine welding processes heretofore used. The thickness of the coating 13 accurately and uniformly fixes the arc length, and the progression of the arc and the amount of electrode metal deposited are determined by the size of the electrode and the current density. Since each inch of weld is made by an inch of electrode, an electrode is selected having a cross-sectional area equal to the desired cross-sectional area of added metal in the weld, allowance being made as usual for the elements lost in the arc. The current densities may correspond to the standard ranges utilized in hand welding, although higher values may be used when desired because disruption of the gaseous shield is prevented by the gravel.

Another outstanding advantage of the present process is that the operator need not approach the weld while the electrode is being consumed. Thus in welding galvanized plates and the like, which give off fumes producing zinc poisoning, the operator may remain out of the area of dangerous concentration of the fumes, and in all cases may be doing other work while the welding proceeds automatically.

The cooling of the weld metal is retarded by the protective arch formed over the weld by the molten gravel or glass, resulting in a substantial decrease in hardness where alloy steel is being welded. When desired, an excess of gravel may be employed to partially insulate the molten layer of gravel from the atmosphere and further retard the cooling. An excess of gravel may also be used to conceal the arc from view so as to "blackout" the welding operation from enemy observation.

Figure 5 illustrates an arrangement which has been found to be satisfactory in carrying out this process with the use of bare, instead of coated, electrodes. In this arrangement a bare electrode 27 is laid upon the seam with a strip of material 28, composed of the material ordinarily used for the coating 13 on the covered electrodes, interposed between the electrode and the plates 10. The strip 28 is made of a uniform thickness to space the electrode the desired distance from the plates 10, and of sufficient width to prevent the electrode from contacting the plates and shorting the welding circuit.

The electrode is welded at intervals to the contact pins 22 in the same manner as the coated electrode previously described except that with the bare electrodes it is found that the contact pins may be more widely spaced without interfering with the proper operation of the process. The strip of material 28, like the conventional coating 13 for the weldrods, may consist of paper, wood flour, or other cellulosic material impregnated with sodium silicate, calcium oxide, and magnesium oxide, or other slag forming and ionizing elements, it being only necessary that the strip 28, like the coating 13, produce sufficient quantities of reducing and ionizing gases to shield and sustain the arc. If desired the silicates or other elements usually present in the electrode coatings which produce a fluxing slag may be omitted from the coating 13 or the strip 28, since the arc is completely shielded by the gas and the weld metal is protected as it cools by the slag coating provided by the fusing of the gravel 26.

In Figures 6 and 8 I have illustrated an arrangement for carrying out my process to make fillet welds in the welding of stiffeners to a bulkhead of a vessel. After the plates 10 have been welded together as described above to form a relatively large assembled bulkhead 30 of the desired shape, the bulkhead may be left lying upon a flat horizontal surface and the series of stiffeners 31 welded to it by fillet welds.

In the illustrated embodiment each stiffener 31 consists of an angle-section having a web 32 to be secured to the bulkhead at right angles to the surface thereof, and a flange 33. In accordance with the usual practice the stiffeners are first arranged in the proper position by tack welding a series of temporary straps 34 to the surface of the bulkhead at spaced points as shown in Figure 6. The stiffener 31 is arranged with its web 32 engaging the surface of the bulkhead 30 and its flange 33 spaced from the horizontal sections 35 of the straps 34. Wedges 36 are then driven into place between the flange 33 and the horizontal portions 35 of the temporary straps so as to tightly clamp the edge of the web 32 against the surface of the bulkhead as shown in Figure 7. Any warping of the bulkhead 30 which may have resulted from the butt welding is thereby removed so that the edge of the flange 32 is held against the surface of the bulkhead throughout its length sufficiently close to permit the making of a good welded joint.

An electrode 38 which may have a coating 39, similar to the electrode 12 and coating 13 previously described, is laid in the angle between the web 32 and the bulkhead 30 on one side as illustrated in Figure 7. At suitable intervals, which may be at about 6 inches to about 18 inches, depending on the current density being used, contact pins 40 are welded to the electrode. This may be done by baring a portion of the rod and welding the end of the pin 40 to the side of the rod or, as illustrated in Figure 9, the end of the pin 40 may be welded between the ends of two separate electrodes 38.

Alternatively, each electrode 38 may have one end bared and bent outwardly as indicated at 46 to form a contact pin. The opposite end of each electrode may be arranged adjacent the bend 46 in the next electrode, as shown in Figure 10. With this arrangement the electrodes should be spaced sufficiently to prevent an arc starting between them prematurely, but should be close enough together so that when the arc reaches the bend 46 the heat and ionizing gases will be sufficient to start an arc at the end of the next electrode.

The electrode is arranged along the entire length of the joint between each stiffener and the bulkhead with the contact pins 40 projecting out at about an angle of 45° from the surface of the bulkhead, as illustrated in Figure 7. A suitable contact element, such as a conventional electrode holder 41, is secured to the end of each contact pin 40. The contact member 41 may be provided with a screw to engage the contact pin 40 or may be provided with spring clamping jaws or the like in accordance with any of the standard constructions for electrode holders for hand arc welding. Each contact member 41 is provided with a conductor such as a flexible cable 42, all of which are connected to a common flexible cable 43 serving as a bus.

For simplicity, I have illustrated in Figure 6 the arrangement of but three contact elements 41 along the length of a stiffener, but it will be understood that a relatively large number, spaced as indicated above, would be required to extend through the height of an ordinary bulkhead for a vessel.

Each contact member 41 is provided with an insulated supporting foot 44 of some material like glass arranged to rest upon the surface of the bulkhead at a point remote from the contact pin 40. A weight 45 of any suitable form is mounted on the contact member 41 adjacent its connection with the contact pin 40 so that the contactor 41 is arranged to exert a substantial downward force upon the electrode 38 to hold the same tightly in the joint between the web 32 of the stiffener and the surface of the bulkhead. Between each pair of contact pins 40 I prefer to provide one or more additional holders to engage the electrode and hold the same in the corner. A suitable form of holder is illustrated in Figture 8 and includes a bar 47 similar to the contactor 41 having a clamp 48 at one end and a foot 49 at the other end to rest upon the surface of the bulkhead. A glass rod or similar member 50 is gripped in the clamp 48 and arranged to engage the side of the electrode 38 at about a 45° angle to the surface of the bulkhead so as to press the electrode into the joint. A weight 51 is supported by the bar 47 to supply a suitable clamping pressure of the glass rod 50 against the electrode.

Both the contactors 41 and the pressure bars 47 are provided with insulated stops 52 below the weights 45 and 51 which are normally spaced from the surface of the bulkhead before welding but which contact the surface of the bulkhead after the contact pins 40 and the glass rods 50 have melted so as to prevent the contactors 41 and pressure bars 47 from falling down into the weld.

The electrode 38 is thus assembled and firmly held in the angle between the web 32 of the stiffener and the surface of the bulkhead throughout the length of the stiffener with contact pins at suitably spaced points electrically connected to the cable bus 43. A bare electrode 53 of relatively small diameter may then be arranged in the corner between the electrode 38 and the web 32 of the stiffener to provide additional metal at the upper corner of the fillet. Gravel 26 such as previously described is then piled in the corner between the stiffener web and the surface of the bulkhead covering the entire length of the electrodes 38 and 53 as in the case of the butt weld previously described. As many seams as desired may be set up and welded at one time, except that in welding stiffeners to bulkheads, as illustrated, I prefer to arrange the electrodes and gravel on one side of each stiffener, weld all of these electrodes, and then arrange the electrodes and gravel on the other side of each stiffener and complete the welding. Each stiffener is fastened to the bulkhead by two fillet welds, one on each side of the web 32, and where two seams are arranged so close together it is preferred to weld them separately to avoid overheating. In order to balance the shrinkage stresses it is also preferred in welding long seams to lay two alined electrodes connected to different welding circuits along each seam and start the arcs simultaneously at the adjacent ends in the center of the seam.

When desired a bare rod or rods with a strip of material to form a gaseous shield, such as the strip 28, may be used in place of the coated electrode 38, it being only necessary to arrange the strip of material 28 in the corner between the stiffener and the bulkhead so that the bare electrodes are held out of contact with the metal.

As the arcs burn along the electrode 38 the material of the electrode and the arc are prevented from spattering or flying out axially from the electrode by the action of the gravel as previously described. In the case of the fillet weld, however, an additional function is performed by the gravel. The normal tendency of the metal melted by the arc would be to spread out horizontally on the surface of the bulkhead without making a satisfactory weld. However, the confining effect of the gravel compels the arc and the molten metal to move into the corner against both the web 32 of the stiffener and the surface of the bulkhead so as to produce a fillet weld 57 as illustrated in Figure 11. The fused gravel forms a tunnel-like covering 58 of glass and partially fused particles over the completed weld. I have found that satisfactory fillet welds may be made without using the extra electrode 53, since the action of the gravel confines the metal to the corner. However, there is a tendency on large fillets for the metal to flow downwardly leaving more metal in the horizontal portion of the fillet than in the vertical portion. This effect is avoided by the small electrode 53, which is simply melted by the heat of the arc from the electrode 38 and provides additional metal in the vertical portion of the fillet.

In Figures 12, 13 and 14 I have illustrated an arrangement for using the present invention in the welding of relatively thick plates, such as armor plate. Two plates 60 to be welded together are scarfed on their meeting edges, as indicated at 61, to form a groove, or V, to receive the weld. The scarfed edges 61 are spaced apart to leave a suitable free distance at the bottom, the groove being closed at the bottom by a backing plate 62.

This is the conventional way of arranging the plates of this nature preparatory to joining the same by a weld. However, when it is attempted to make the weld with the usual automatic welding machines it is found that the excessive quantities of heat developed in depositing a thick layer of metal injures the special treatment steel such as armor plate. It is difficult, if not impossible, to regulate such automatic machines to deposit a sufficiently thin layer of weld metal to avoid injuring the steel. When it is attempted to hand weld the joint it is impossible to use an electrode of sufficient length to make a weld entirely across the seam without interrupting the weld. The craters left in the weld when the arc is broken constitute points of weakness which must be chipped out before the weld is resumed with a new rod. This is an extremely laborious operation, particularly with the hard weld metal which must be used for armor plate and similar special treatment steel, such for example as the weld metal deposited by 25% chromium 20% nickel electrodes.

In accordance with the present process the backing plate 62 is extended beyond the lateral sides of the plates 60 to be joined together as indicated at 63. A dam is built at each end of the seam by tack welding blocks 64 to the sides of the plates 60, the blocks being formed with scarfed surfaces 65 constituting continuations of the scarfed edges 61 of the plates.

A continuous electrode 66 which is preferably provided with a coating 67 as previously described is arranged in the groove between the edges 61 with its ends extending into the dams formed by the block 64 as shown in Figure 12. The electrode is provided with suitably spaced contact pins 68 which are connected to one side of the welding generator 69 or other source of welding current. The electrode is covered with gravel or other material 26 as described in connection with the previous embodiments of the invention. Preferably the arc is started at one end of the electrode 66 in the dam between two of the blocks 64 and is allowed to progress without interruption throughout the groove between the plate 60 and end in the dam provided by the other blocks 64.

To insure good fusion at the extreme bottom corners I prefer to first deposit two small fillets 71 between the bottom edges of the plate 60 and the backing up plate 62 before burning the first self-consuming electrode. Thereafter the first electrode 66 is welded, the slag is removed and another self-consuming electrode of the desired size is placed in the joint and welded. Preferably the electrodes 66 are of relatively small diameter so that each deposits a layer of metal about ⅛ of an inch thick. Thus for welding a joint between two-inch plates about sixteen separate layers are deposited as indicated in Figure 12.

In this way the arc both starts and finishes outside the seam between the plates 60 leaving no craters or other points of weakness to be chipped out before continuing with the welding operation. When the joint is completed the dam 64 and the welds which have been deposited in them by the ends of the electrodes may be cut off by a torch or any similar manner. It is also possible with this arrangement to start the arc at or near the center of the seam, between two alined electrodes 66 connected to different circuits as described in connection with the butt welds illustrated in Figures 1 to 4. The starting point of the arc in most instances does not constitute an objectionable defect so long as the weld contains no craters resulting from the breaking of the arc.

In Figure 15 I have illustrated an arrangement for the application of the present invention to the making of composite metal. It is frequently desired to weld a layer of metal of one composition to the surface of metal of a different composition. For example stainless steel is deposited by welding on a slab of ordinary low carbon steel prior to rolling so that after the slab has been rolled the resultant plate, sheet, or strip consists of a body of low carbon steel with a stainless steel surface.

This may be accomplished with the present invention by laying a series of electrodes 73 along the surface of a slab or the like 74. Preferably the electrodes are provided with coatings 75 for forming a gaseous shield about the arc as previously described although gaseous shielding material may be supplied to the arc in other ways. The series of electrodes are then covered with gravel 26 such as previously described and welded simultaneously depositing a layer of the electrode metal on the surface of the slab 74.

It is also preferable, in order to reduce the expense of the electrodes, to employ electrodes 73 of relatively cheap material and add the alloying elements separately. For example a layer 76 of ferrochrome and metallic nickel particles or the like may be spread upon the surface of the slab 74 before arranging the electrodes 73 thereof. The chromium, nickel, or other alloying ingredients may be spread uniformly along the surface and ordinary steel electrodes 73 of a diameter to supply the desired amount of steel arranged thereon. The action of the arcs fuses the surface of the parent metal 74, the layer of alloying ingredients 76, and the metal of the electrodes themselves and allows the same to mix and alloy to form a uniform alloy layer of the desired composition and thickness.

In this application of the process it is preferred to connect one side of a welding current circuit to each electrode 73 with the other side connected to the slab 74. This may be accomplished by providing a separate welding generator for each electrode, or, when it is desired to use alternating current, a transformer may be provided for each electrode. As shown in Figure 15 transformers 77 may be connected to the three circuits of a three phase system supplied by line wires 78, 79, and 80, so that each circuit supplies every third electrode through a transformer. In this way the load is balanced on the supply lines, and at the same time the heat developed by the arcs is balanced through each group of three electrodes, providing a steadier and more uniform heating of the slab 74 and the layer of alloying material 76.

Although I have illustrated and described a number of specific applications of the present invention, it will be understood that it may be applied in many other ways and that many variations and modifications in the methods and apparatus described may be resorted to without departing from the spirit and scope of the invention as defined in the following claims.

I claim:

1. A process of welding comprising forming an electric arc between a metallic electrode and a metal member to be welded, maintaining a shield of gases containing arc ionizing ingredients around the arc, progressing the arc along the piece to be welded, and surrounding the arc with slag forming material free from arc ionizing ingredients in particles large enough to permit the gas of the gaseous shield to escape without displacing the slag from the vicinity of the arc and small enough to be fused by the heat of the arc.

2. A process of welding comprising forming an electric arc between a coated metallic electrode and a metal member to be welded, maintaining around the arc a gaseous arc ionizing shield evolved from the coating on said electrode, progressing the arc along the piece to be welded, surrounding the arc with silica gravel in particles large enough to permit the gas of the gaseous shield to escape without displacing the slag from the vicinity of the arc and small enough to be fused by the heat of the arc, maintaining a fused envelope of said silica gravel around the arc and spaced therefrom by the gas evolved from the coating on said electrode.

3. A process of welding comprising forming an electric arc between a coated metallic electrode and a metal member to be welded, maintaining around the arc a gaseous arc ionizing shield evolved from the coating on said electrode, progressing the arc along the piece to be welded, surrounding the arc with broken glass in particles large enough to permit the gas of the gaseous shield to escape without displacing the glass from the vicinity of the arc and small enough to be fused by the heat of the arc, maintaining a fused envelope of said glass around the arc and spaced therefrom by the gas evolved from the coating on said electrode.

4. A process of welding comprising laying a coated electrode along a line of weld, covering the electrode with slag forming material in particles large enough to permit the gas evolved by the coating to escape without blowing away the slag forming material, and small enough to be fused by the heat of the arc, including the electrode in a welding circuit, and causing an arc to progress along the electrode.

5. A process of welding comprising laying a coated electrode along a surface to be welded, covering the electrode with siliceous material in particles large enough to permit the gas evolved by the coating to escape without displacing the material from the vicinity of the arc and small enough to be fused by the heat of the arc, starting an arc between the electrode and the surface to be welded and supplying current to cause the arc to progress along the electrode and deposit the same on the surface to be welded.

6. A process of welding comprising laying a coated electrode along a line of weld, covering the electrode with slag forming material in particles large enough to permit the gas evolved by the coating to escape and small enough to be fused by the heat of the arc, supplying welding current to the electrode to cause an arc to progress along the same, and progressively advancing the point at which current is supplied to the electrode as the electrode is consumed.

7. A process of welding comprising arranging an electrode, material to form a gaseous arc ionizing shield and slag forming material along a line of weld, with the material to form the gaseous shield disposed in contact with the electrode and with the slag forming material covering said electrode and said material to form a gaseous shield, said slag forming material being free from arc ionizing ingredients and consisting of particles large enough to permit the gas evolved by said first mentioned material to escape and small enough to be fused by the heat of the arc, including the electrode in a welding circuit, and causing an arc to progress along the electrode and deposit the material thereof along the line of weld.

8. A process of welding comprising arranging an electrode, material to form a gaseous arc ionizing shield, and silica gravel free from arc ionizing ingredients along a line of weld with said material in contact with said electrode and said gravel covering said electrode and said material, said gravel being in particles large enough to permit the gas evolved by said material to escape and small enough to be fused by the heat of the arc, including the electrode in a welding circuit, and causing an arc to progress along the electrode and deposit the material thereof along the line of weld.

9. A process of welding comprising arranging an electrode, material to form a gaseous arc ionizing shield, and broken glass free from arc ionizing ingredients along a line of weld with said material in contact with said electrode and said glass covering said electrode and said material, said glass being in particles large enough to permit the gas evolved by said material to escape and small enough to be fused by the heat of the arc, including the electrode in a welding circuit, and causing an arc to progress along the electrode and deposit the material thereof along the line of weld.

10. A process of welding comprising laying a strip of material containing arc ionizing and gas forming ingredients along a metal surface to be welded, laying a metallic electrode along the strip of material so that it is insulated thereby from the metal surface, covering the electrode with slag forming material in particles large enough to permit the gas evolved by said strip of material to escape and small enough to be fused by the heat of the arc, supplying welding current to the electrode and the metal surface, starting an arc between the electrode and the surface and progressing the arc along the electrode.

11. A process of welding comprising laying an electrode substantially round in cross section along a substantially horizontal surface and against a substantially vertical surface, insulating the electrode from said surfaces by material which forms a gaseous shield when burned by the arc, covering the electrode with slag forming material in particles large enough to permit the gas of the gaseous shield to escape and small enough to be fused by the heat of the arc, starting an arc between the electrode and said surfaces, and supplying electric current to cause the arc to progress along the electrode.

12. A process of welding comprising laying an electrode substantially round in cross section along a substantially horizontal surface and against a substantially vertical surface, insulating the electrode from said surfaces by material which forms a gaseous shield when burned by the arc, covering the electrode with siliceous material in particles large enough to permit the gas of the gaseous shield to escape without displacing the siliceous material from the vicinity of the arc and small enough to be fused by the heat of the arc, starting an arc between the electrode and said surfaces and supplying electric current to cause the arc to progress along the electrode.

13. A process of welding comprising laying an electrode substantially round in cross section along a substantially horizontal surface and against a substantially vertical surface, insulating the electrode from said surfaces by material which forms a gaseous shield when burned by the arc, laying another electrode in the corner between the first electrode and the vertical surface, covering the electrode with slag forming material in particles large enough to permit the gas of the gaseous shield to escape and small enough to be fused by the heat of the arc, starting an arc between the first electrode and said surfaces and supplying electric current to cause the arc to progress along said electrode.

14. A process of welding metallic members together comprising arranging a coated metallic electrode along a seam between said members, said electrode being coated with material which insulates the electrode from said members and supplies a gaseous arc ionizing shield, pressing the electrode firmly into the seam, covering the electrode with granular slag forming material free from ionizing elements in particles small enough to be fused by the heat of the arc and large enough to permit the gas of said gaseous shield to escape without blowing away the slag forming material, and supplying current to the electrode and to said members to cause an arc to progress along the length of the electrode and form a weld between said members.

15. A process of welding two angularly related metallic members together comprising arranging a coated metallic electrode in a corner between angularly related surfaces of said members, said electrode being coated with material which insulates the electrode from said members and supplies a gaseous arc ionizing shield, pressing the electrode firmly into the corner at a plurality of spaced points along the length thereof, covering the electrode with granular slag forming material free from ionizing elements in particles small enough to be fused by the heat of the arc and large enough to permit the gas of said gaseous shield to escape without blowing away the slag forming material, and supplying current to the electrode and to said members to cause an arc to progress along the length of the electrode and form a weld between said members.

16. The process of making bulkheads comprising arranging angular section stiffeners along a flat plate, holding the stiffeners in position with a web abutting the surface of the plate by spanning the stiffeners with temporary clamps secured to the plate, arranging electrodes and material to form a gaseous shield along and parallel with the corners between the flat plate and one side of the webs of the stiffeners and under the temporary clamps spanning the stiffeners, covering the electrodes with granular slag forming material in particles large enough to permit the gas evolved by said first mentioned material to escape and small enough to be fused by the heat of the arc, and supplying welding current to the electrodes to cause arcs to progress along the same and form fillet welds between the surface of the plate and the webs of the stiffeners.

17. A process of welding comprising forming an electric arc between a metallic electrode and a metal member to be welded, maintaining a shield of gases containing arc ionizing ingredients around the arc, progressing the arc along the piece to be welded, and surrounding the arc with slag forming material free from arc ionizing ingredients in particles having maximum dimensions ranging from about 1/8 of an inch to about 1/4 of an inch, said particles being large enough to permit the gas of the gaseous shield to escape without displacing the slag from the vicinity of the arc and small enough to be fused by the heat of the arc.

18. A process of welding comprising laying a coated electrode along a line of weld, covering the electrode with slag forming material in particles having maximum dimensions ranging from about 1/8 of an inch to about 1/4 of an inch, said particles being large enough to permit the gas evolved by the coating to escape without blowing away the slag forming material, and small enough to be fused by the heat of the arc, including the electrode in a welding circuit, and causing an arc to progress along the electrode.

ROBERT E. KINKEAD.